(12) United States Patent
Stasin

(10) Patent No.: US 8,241,553 B2  
(45) Date of Patent: Aug. 14, 2012

(54) SPICE GRINDERS

(76) Inventor: Howard Robert Stasin, Ottery (ZA)

( * ) Notice: Subject to any disclaimer, the term of this patent is extended or adjusted under 35 U.S.C. 154(b) by 66 days.

(21) Appl. No.: 12/664,730

(22) PCT Filed: Jun. 13, 2008

(86) PCT No.: PCT/IB2008/052342  
§ 371 (c)(1), (2), (4) Date: Dec. 15, 2009

(87) PCT Pub. No.: WO2008/152608  
PCT Pub. Date: Dec. 18, 2008

(65) Prior Publication Data  
US 2010/0187343 A1 Jul. 29, 2010

(30) Foreign Application Priority Data  
Jun. 15, 2007 (GB) .................................. 0711588.4  
Jun. 15, 2007 (GB) .................................. 0711589.2

(51) Int. Cl.  
*B29C 49/02* (2006.01)

(52) U.S. Cl. ..................................... 264/537; 241/169.1

(58) Field of Classification Search ............... 241/169.1; 215/44; 264/535, 537; 425/525, 533  
See application file for complete search history.

(56) References Cited

U.S. PATENT DOCUMENTS 4,451,426 A * 5/1984 Branchadell .................. 264/535  
4,767,069 A * 8/1988 Kim .......................... 241/152.2

FOREIGN PATENT DOCUMENTS

| DE | 20 2004 016834 | 2/2005 |
| GB | 2 180 825 | 4/1987 |
| GB | 2 217 231 | 10/1989 |
| WO | WO 2008/056288 | 5/2008 |

OTHER PUBLICATIONS

International Search Report for International Application PCT/IB2008/052342.

* cited by examiner

*Primary Examiner* — Mark Rosenbaum  
(74) *Attorney, Agent, or Firm* — Stites & Harbison PLLC; Douglas E. Jackson

(57) ABSTRACT

An injection moulded preform is disclosed which is then blown to form a bottle (16) for containing spices and other material which is ground before use. The preform is moulded with teeth (18, 20) which are on the inside of the part of the preform which constitutes the neck. A rotatable structure which fits onto the bottle has a core which fits into the neck. The core has external teeth which co-operate with the teeth (18, 20) of the preform to define a grinding gap.

3 Claims, 10 Drawing Sheets

SPICE GRINDERS

FIELD OF THE INVENTION

THIS INVENTION relates to spice grinders.

BACKGROUND TO THE INVENTION

Spice grinders known to the Applicant comprise a first component that screws or snap fits onto a spice container such as a bottle. A second component fits onto the first component and is rotatable with respect to the first component. One of the components has an array of teeth which are on a cylindrical surface and form a burr. The other component is configured with angled protrusions that force the spice against the burr during relative rotation of the components so that the spice is ground against the burr. The grinders usually include a third component in the form of a lid which fits into the second component.

To use the grinder, the lid is prised off the second component, the grinder inverted and the second component rotated with respect to the first component. When sufficient spice has been ground, the grinder is returned to its upright condition and the lid re-fitted.

In simple grinders the gap in between the first and second components is of fixed width. In more complex grinders the width of the grinding gap can be adjusted so that it is possible to grind to a fine powder or to a coarser powder.

Whilst generally referred to as "spice grinders", such structures are used not only for grinding spices but also for grinding plant material in the form of herbs.

The present invention seeks to provide an improved spice grinder.

BRIEF DESCRIPTION OF THE INVENTION

According to one aspect of the present invention there is provided an injection moulded preform comprising a neck and a body, the neck being moulded with internal, integral grinding teeth.

The preform can have external formations on the neck to enable a cap to be fitted. The formations can be threading or, alternatively, can be one or more circumferentially extending grooves or one or more circumferentially extending raised ribs.

According to a further aspect of the present invention there is provided a method of producing a spice container which comprises injection moulding a preform as defined above and thereafter blow moulding the preform.

Preferably the preform is stretch blow moulded.

Said container in one form comprises the fixed component of the spice grinder and a rotatable component is provided which fits on the fixed component, the rotatable component having grinding teeth which face the grinding teeth of the fixed component across a grinding gap, the position of the components with respect to one another being adjustable thereby to enable the width of the grinding gap to be varied, the grinder being characterized by a ring having a spiral surface which co-operates with a spiral surface on the fixed component whereby rotation of the ring with respect to the fixed component displaces the ring axially with respect to the fixed component, said rotatable component being rotatable with respect to both the ring and the fixed component but immovable with respect to the ring in the direction of the axis about which rotation takes place.

According to a still further aspect of the present invention there is provided a spice grinder which comprises a fixed component and a rotatable component, the components having grinding teeth which face one another across a grinding gap, the position of the components with respect to one another being adjustable thereby to enable the width of the grinding gap to be varied, the grinder being characterized by a ring having a spiral surface which co-operates with a spiral surface on the fixed component whereby rotation of the ring with respect to the fixed component displaces the ring axially with respect to the fixed component, said rotatable component being rotatable with respect to both the ring and the fixed component but immovable with respect to the ring in the direction of the axis about which rotation takes place.

Said ring is preferably externally of a sleeve of the fixed component and internally of a sleeve of the rotatable component.

The spiral surface of the ring can be an end surface of the ring. The spiral surface of the fixed component can be the undersurface of a bead which encircles one end of the sleeve of the fixed component.

A circumferentially extending external rib can be provided on the ring and a corresponding groove can be provided on the sleeve of the rotatable component, engagement between the rib and groove preventing relative axial movement between the ring and rotatable component.

There can be one or more detents and one or more notches which, by co-operating, provide a series of discrete positions in which the ring and fixed component can be locked relatively to one another.

BRIEF DESCRIPTION OF THE DRAWINGS

For a better understanding of the present invention, and to show how the same may be carried into effect, reference will now be made, by way of example, to the accompanying drawing in which.

DETAILED DESCRIPTION OF THE DRAWINGS

Figure 1:
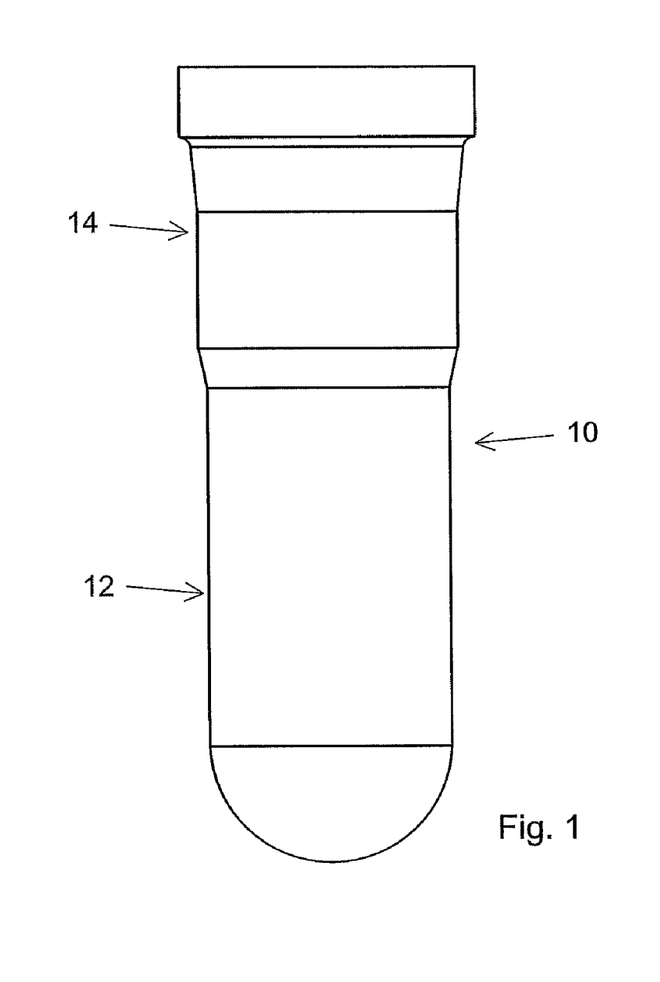
FIG. 1 is an elevation of a preform.

The preform 10 shown in FIG. 1 is injection moulded in a suitable synthetic plastic material. PET and polycarbonate are materials that can be used. The preformed 10 is hollow and includes a body portion 12 and a neck 14. Once stretch blow moulded, the preform takes on the form of the bottle which is shown in FIGS. 2 to 4 and 9 and is designated 16.

Figures 3, 4, 5:
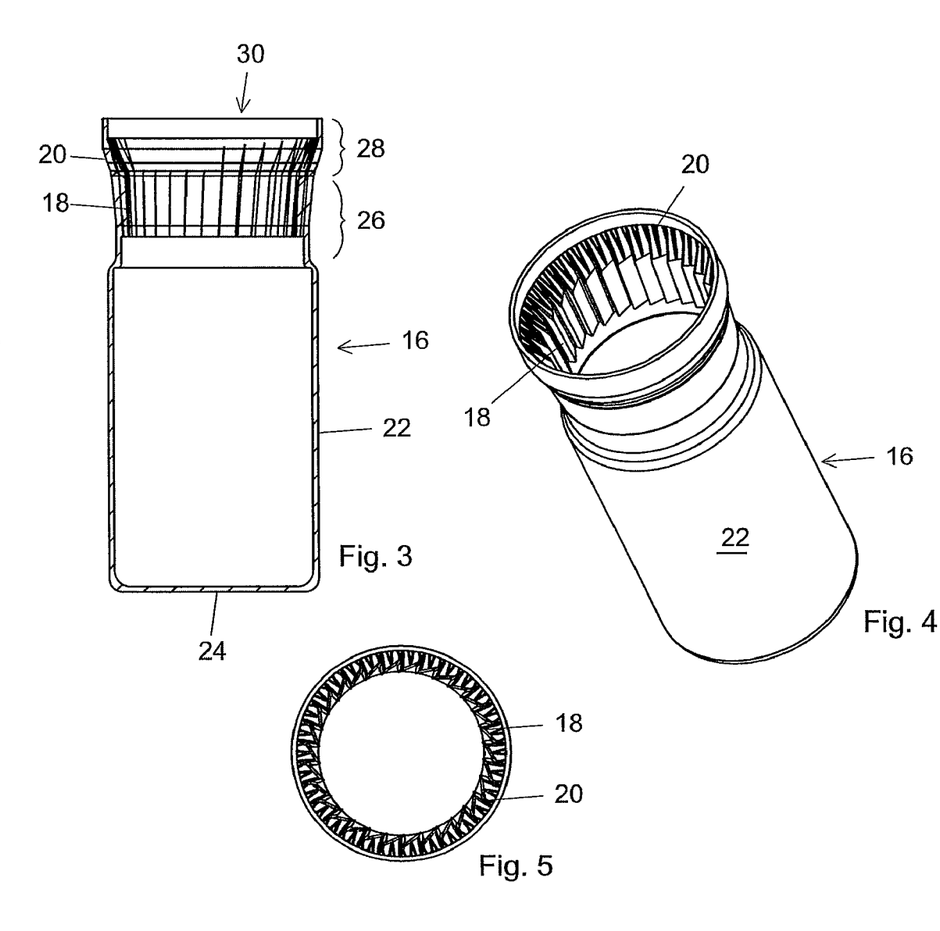
FIG. 3 is an axial section through the bottle of FIG. 2.
FIG. 4 is a pictorial view from above of the bottle of FIGS. 2 and 3.
FIG. 5 is a top plan view of the bottle of FIGS. 2 to 4.

Internally the preform 10 has two rings of teeth 18, 20 which are integrally moulded as part of the preform 16 (see particularly FIGS. 3, 4 and 5). The teeth 18, form part of the neck 14.

Figure 2:
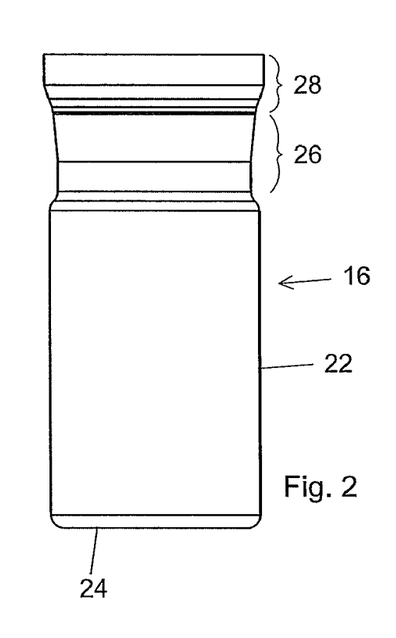
FIG. 2 is an elevation of a blown bottle.

The bottle 16, see particularly FIGS. 2 to 4, has a cylindrical side wall 22 and a bottom wall 24 which is integral with the side wall 22.

The part of the neck designated 26 is of smaller diameter, both internally and externally, than the side wall 22. The neck part 26 is also of smaller diameter than the neck part 28 which is immediately adjacent the open mouth 30 of the bottle 16.

Figure 6:
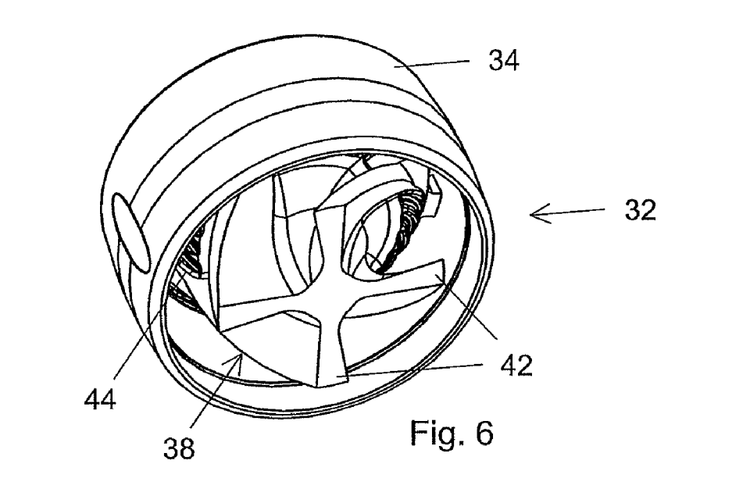
FIG. 6 is an underneath pictorial view of a rotatable grinder component.
Figure 7:
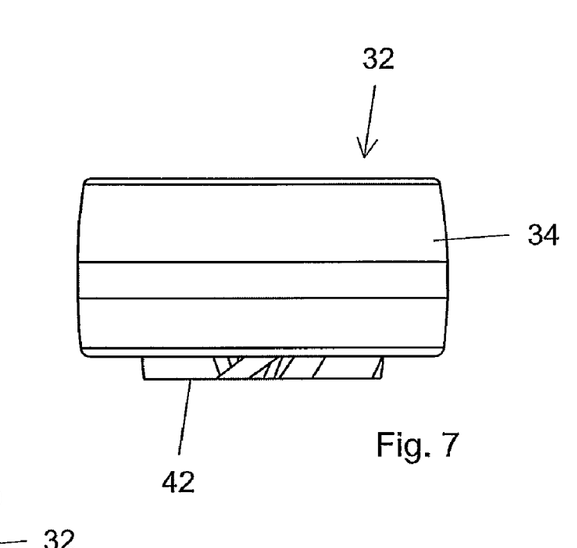
FIG. 7 is a side elevation of the component of FIG. 6.
Figure 8:
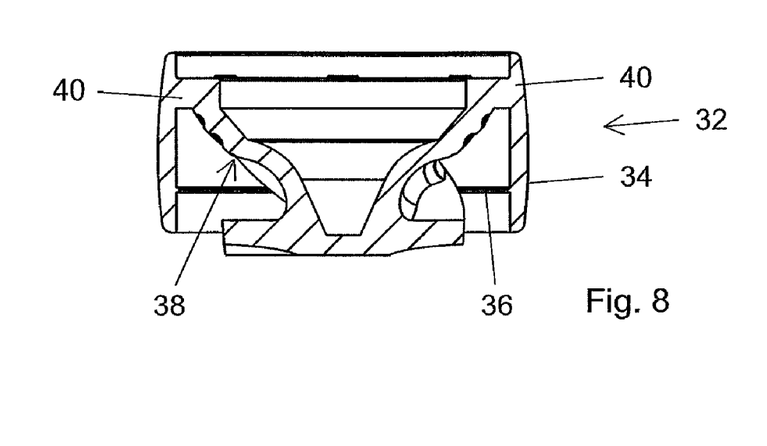
FIG. 8 is a section through the component of FIGS. 6 and 7.
Figure 9:
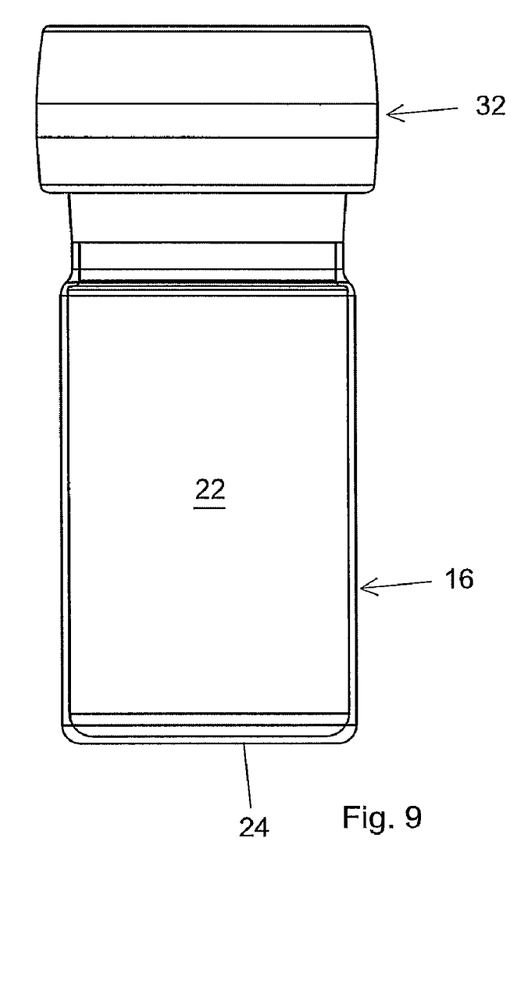
FIG. 9 is a side elevation of the bottle of FIGS. 2 to 5 fitted with the grinder component of FIGS. 6 to 8.

The component 32 shown in FIGS. 6 to 8 is a snap fit on the bottle 16, the component 32 fitting over the neck part 28 (see FIG. 9) and seating in the neck part 26. The component 32 is freely rotatable on the bottle 16. The component 32 comprises a sleeve 34 which has an internal circumferentially extending rib 36. This rib snaps into an internal circumferentially extending groove (not shown) of the neck 14.

A cone-shaped central core 38 is connected to the sleeve 34 by a spider which includes radial arms 40 with gaps between them. Teeth for breaking the contents of the bottle 16 are shown at 42 and cooperate with the coarser teeth 18 which are inside the neck 14.

The core 38 also has, on the outside thereof, an array of finer grinding teeth 44 which cooperate with the teeth 20. The gaps between the arms 40 allow ground pepper etc to fall from the grinder once it has been inverted and the component 32 turned on the bottle 16.

Figure 10:
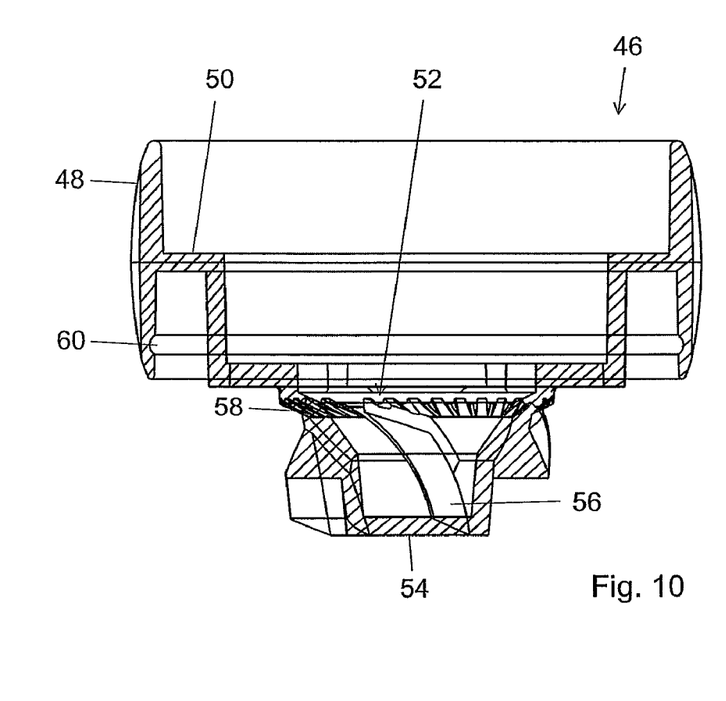
FIG. 10 is a diametral section through another form of rotatable grinder component of a spice grinder.
Figure 11:
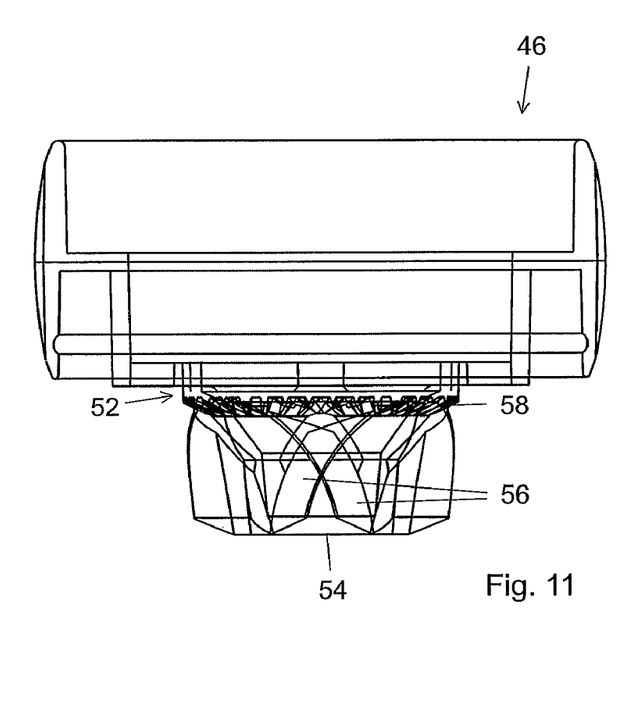
FIG. 11 is a side elevation of the rotatable component of FIG. 10.

The rotatable component 46 illustrated in FIGS. 10 and 11 comprises an outer sleeve 48 which is joined by a web 50 to a central core 52. The core 52 is hollow and is closed at its lower end by a transverse wall 54. The core 52 has external teeth 56 which are intended to crack or break up the product to be dispensed. The teeth 56 are of spiral form so that, when the grinder is inverted from the position shown in FIGS. 10 and 11, they push the product downwardly towards the grinding gap bounded internally by external grinding teeth 22 of the core 52.

The web 50 extends inwardly from the middle of the sleeve 48. Below the web 50 the sleeve 48 has a circumferentially extending internal groove 60.

Figure 12:
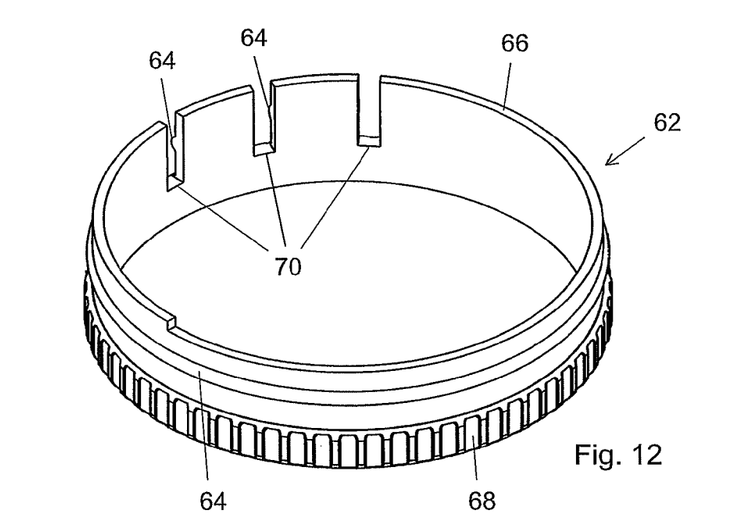
FIG. 12 is a pictorial view of a ring of the spice grinder.
Figure 13:
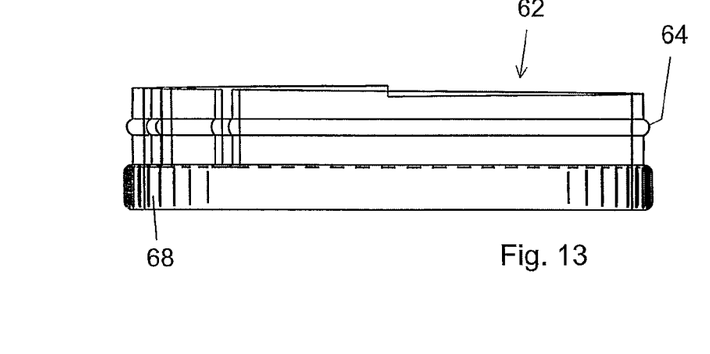
FIGS. 13 and 14 are elevations of the ring of FIG. 12 from two different directions.
Figure 14:
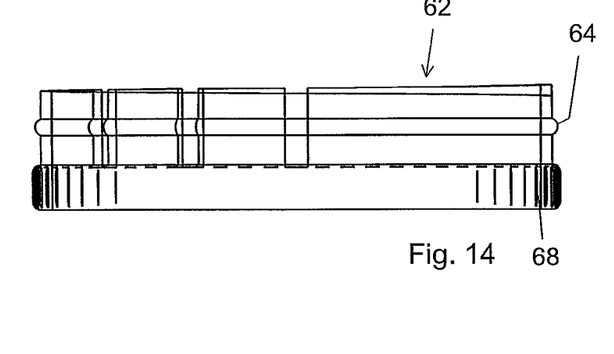
Figure 15:
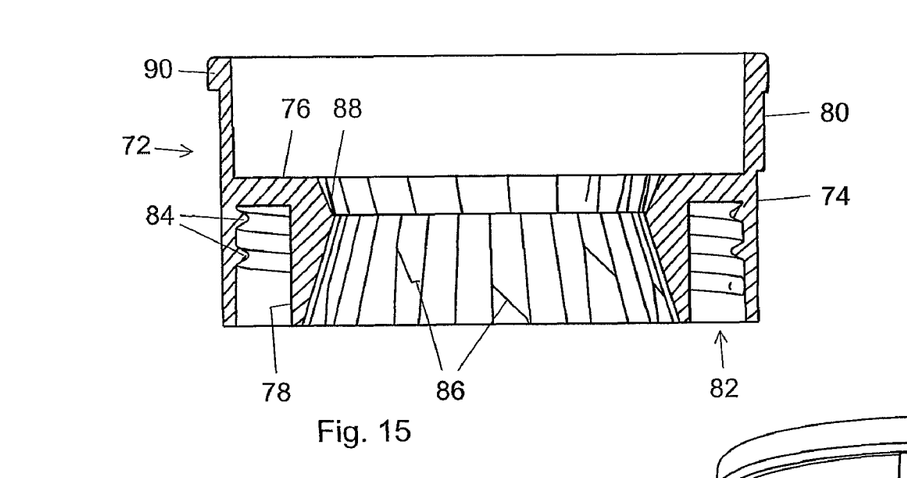
FIG. 15 is a diametral section through a fixed component of the spice grinder.
Figure 16:
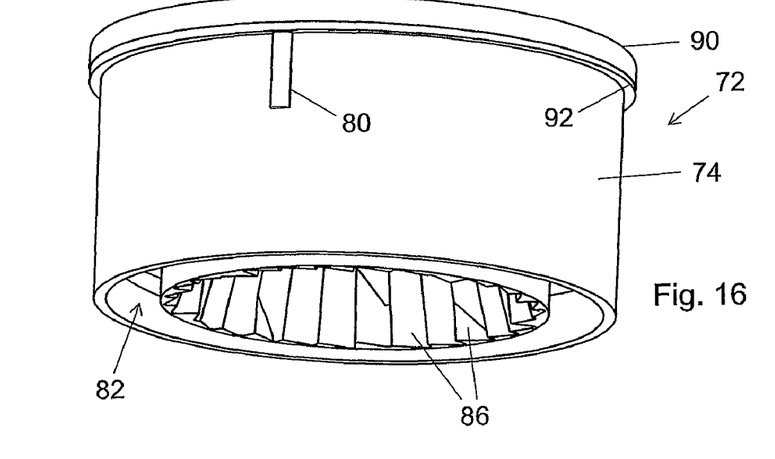
FIG. 16 is a pictorial view of the fixed component.
Figure 17:
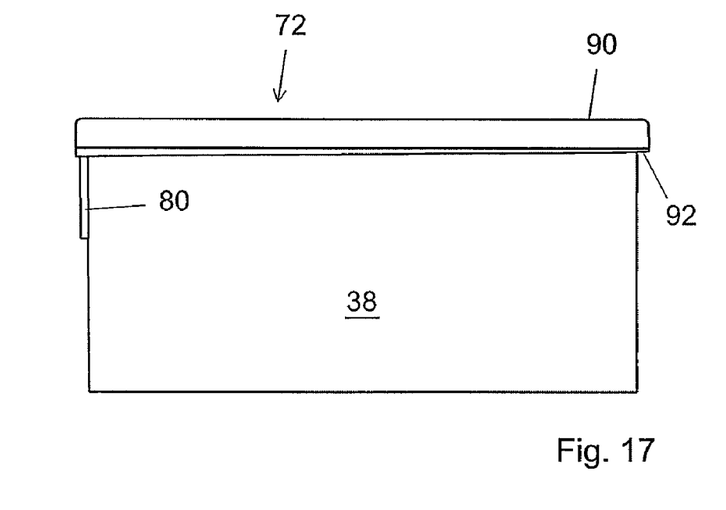
FIGS. 17 and 18 are elevations of the fixed component from two different directions.
Figure 18:
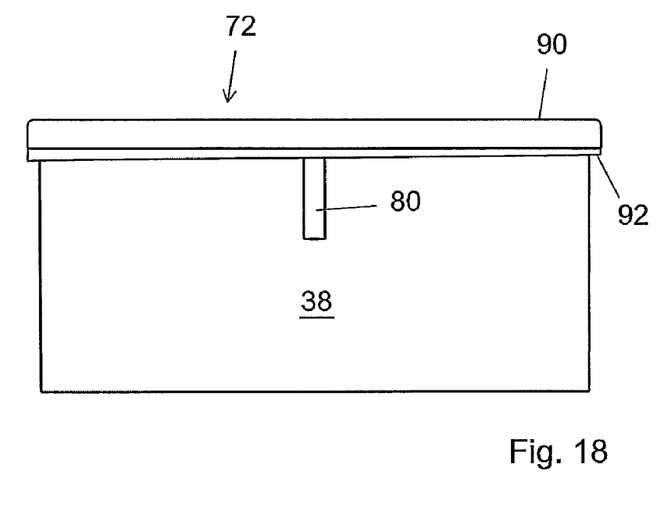
Figure 19:
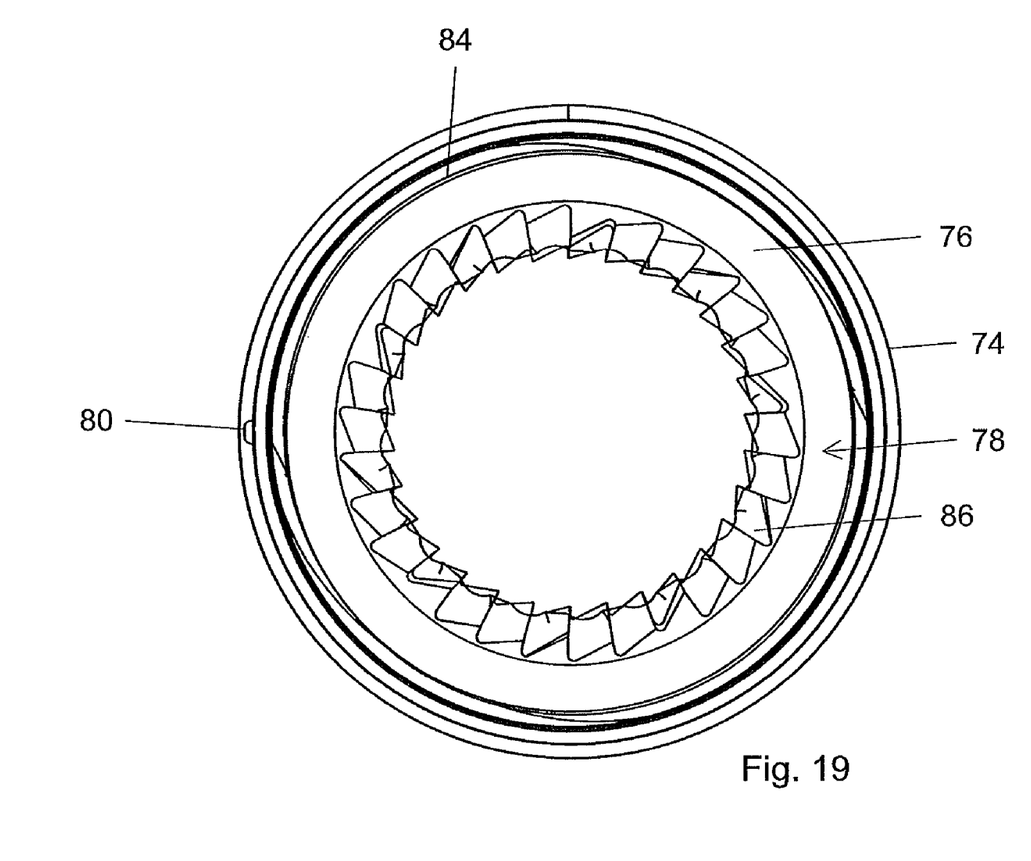
FIG. 19 is an underneath plan view of the fixed component.
Figure 20:
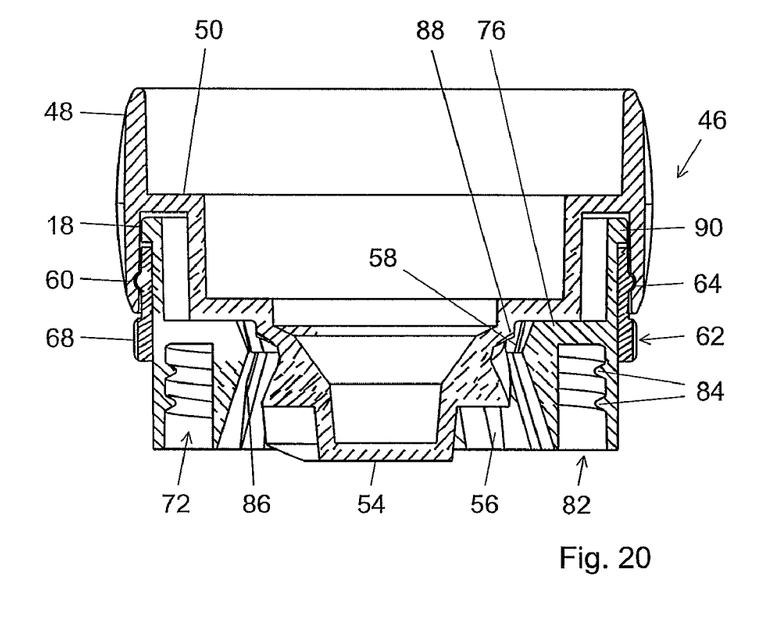
FIG. 20 is a diametral section through the assembled spice grinder.
Figure 21:
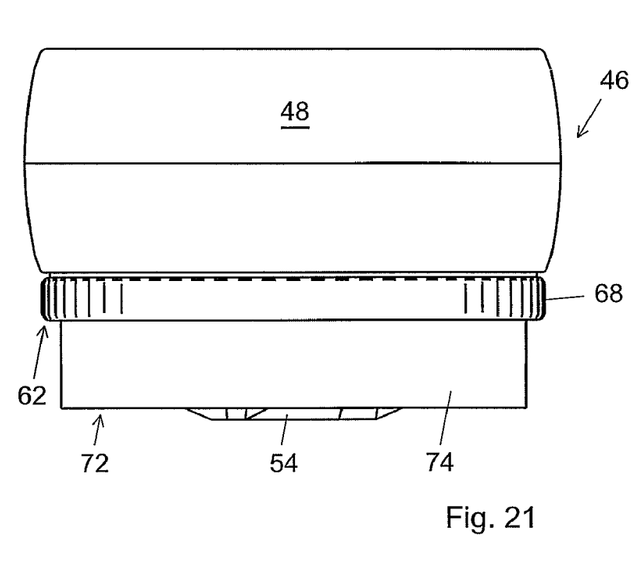
FIG. 21 is an elevation of the assembled spice grinder.

The ring 62 shown in FIGS. 12 to 14 has a smooth internal bore and a circumferentially extending external rib 64. The rib 64 fits in the groove 60 (see FIG. 11).

The upper edge 66 of the ring 62 is in the form of an inclined spiral surface. FIGS. 13 and 14 illustrate the configuration of the spiral surface.

The lower part 68 of the ring 62 is formed with axially extending parallel ridges and valleys (see particularly FIG. 12). The part 68 of the ring 62 is below the sleeve 48 in the assembled grinder and can be gripped and turned as will be described hereinafter.

Three slots 70 are formed in the upper edge of the ring 62.

The fixed component shown in FIGS. 15 to 19 is designated 72 and comprises an outer sleeve 74, a web 76 and core 78. A protruding detent 80 which co-operates with the slots 70 is provided on the outer surface of the sleeve 74.

The sleeve 74 extends both above and below the web 76 and the core 78 extends downwardly from the web 76. A circumferentially extending gap 82 is bounded internally by the core 78 and externally by the part of the sleeve 74 below the web 76. The gap 82 receives the neck of a bottle (not shown) which has external threading. The threading on the bottle is compatible with threading 84 formed on the inside surface of the lower part of the sleeve 74 which bounds the gap 82.

The core 78 is formed internally with cracking and breaking teeth 86 which co-operate with the teeth 56. The core 78 also has grinding teeth 88 which co-operate with the grinding teeth 58 of the rotatable component 46.

The upper end of the sleeve 74 is thicker, measured radially, than the remainder of the sleeve thereby to provide a bead 90 which, in radial cross-section, is rectangular. This configuration results in an overhang the lower surface 92 of which is in the form of a spiral (see particularly FIGS. 17 and 18).

The grinder is assembled by slipping the ring 62 over the sleeve 74 until the edge 66 of the ring 62 encounters the surface 92.

The lower part 68 of the ring 62 is then gripped to prevent it moving with respect the component 72 and the rotatable component 46 is pressed onto the ring 62 until the rib 64 enters the groove 60. The grinder is now assembled and can be screwed onto the top of the filled bottle. The teeth 56 and 86 face one another across a breaking or cracking gap, and the teeth 58 and 88 face one another across a grinding gap.

The detent 80 is in one of the slots 70. The angular position of the component 72 with respect to the ring 62 depending on which one of the slots 70 the detent 80 is in. This determines the relationship between the edge 66 and the surface 92, and this is turn determines the axial position of the component 46 and the ring 62 with respect to the fixed component 74. It will be understood that the ring 62 and component 46 cannot move axially with respect to one another due to the interlock between the groove 70 and the rib 64.

During grinding the locking action between the detent 80 of the fixed component 72 and the notch 70 of the ring 62 in which it is seated prevents the ring 62 from rotating. Hence the component 46 turns with respect to both the ring 62 and the component 74 whereby cracking, breaking and grinding occurs in the gaps between the facing sets of teeth.

To adjust the grinding gap the part 68 of the ring 62 is gripped and turned so that the detent 80 disengages from the notch 70 in which it was seated. As the ring 62 turns, the detent 80 enters another notch 70. Turning of the ring causes the edge 66 to "run up" or "run down" the surface 92. This displaces the ring 62 and component 46 with respect to the component 74 thereby to vary the width of the grinding gap between the teeth 58 and 88.

The number of notches 70 provided depends on the number of degrees of grinding that it is desired to obtain between finest and coarsest.

The ring 62 has a single edge 66 and the component 72 has a single surface 92. It is, however, possible to provide the ring 62 with two axially spaced edges 66 and the components 72 with two axially spaced surfaces 92. In this form, regardless of the direction in which the ring is being adjusted, it is driven positively in the axial direction by one of the edges 66 and the associated surface 92.

The grinding gap of the spice grinder illustrated in FIGS. 1 to 9 can be adjustable in the same way that the grinding gap of the spice grinder of FIGS. 10 to 21 is adjustable. The preform is moulded with an external spiral surface which is equivalent to the surface 92. It is also moulded externally with a detent equivalent to the detent 80. A ring equivalent to the ring 62 is provided. The ring is split axially so that it can be opened up and snapped on to the preform's neck rather than being slid on axially. The detent on the external surface of the preform enters one of the slots 70 in the ring and this prevents, during normal grinding operation, the ring from rotating on the preform. The rotatable component rotates both with respect to the preform and with respect to the ring, the preform and the ring effectively constituting a single component, except when the ring is manually turned on the preform to force the detent out of the slot in which it is seated and into a different slot thereby adjust the grinding gap.

The invention claimed is:

1. A method of producing a spice container comprising the steps of:
    injection moulding a preform to form a neck and a body, the injection moulded neck including moulded internal, integral grinding teeth; and thereafter
    blow moulding the preform into a spice container.

2. A method as claimed in claim 1, wherein the blow moulding step is stretch blow moulding.

3. A method of producing a spice container as claimed in claim 1, further comprising the steps of:
    locating a spice grinder on the spice container, said locating step including the steps of
        making a fixed component with grinding teeth, a rotatable component with grinding teeth and with a spiral surface, and a ring with a spiral surface;
        fitting the rotatable component on to the fixed component, the fitting step including the steps of
            facing the grinding teeth of the rotatable component opposite the grinding teeth of the fixed component and across a grinding gap,
            positioning the fixed and rotatable components with respect to one another to be adjustable thereby to enable a width of the grinding gap to be varied,
        arranging the ring having the spiral surface to co-operate with the spiral surface on the fixed component, whereby a rotation of the ring with respect to the fixed component displaces the ring axially with respect to the fixed component, and
        arranging the rotatable component to be rotatable with respect to both the ring and the fixed component but immovable with respect to the ring in the direction of an axis about which the rotation takes place.

* * * * *